United States Patent Office 3,442,897
Patented May 6, 1969

3,442,897
PROCESS FOR THE MANUFACTURE OF PHTHALAZINES AND PHTHALAZONES FROM α,α' CHLORINATED XYLENE COMPOUNDS
Walter Fuhrer, Birsfelden, Switzerland, assignor to Ciba Corporation, New York, N.Y., a corporation of Delaware
No Drawing. Filed July 21, 1965, Ser. No. 473,842
Claims priority, application Switzerland, May 5, 1965, 6,279/65
Int. Cl. C07d 51/06
U.S. Cl. 260—250          15 Claims

ABSTRACT OF THE DISCLOSURE

Process which comprises reacting an $\alpha,\alpha,\alpha',\alpha'$ - tetrachloro - ortho - xylene, an $\alpha,\alpha,\alpha,\alpha',\alpha'$ - pentachloro - orthoxylene or a mixture of these compounds with hydrazine sulfate in concentrated sulfuric acid and, if desired, isolating the resulting phthalazines and/or phthalazones. The products are useful as intermediates for the manufacture of medicinals, e.g. they may be used for making 2-aralkylphthalazinium salts having antiparasitic or anthelmintic activity (see Belgian Patent 646,343) or for making 1-hydrazinophthalazines useful for lowering blood pressure (see U.S. Patent No. 2,484,029).

---

The present invention provides a new process for the manufacture of phthalazines and phthalazones.

It is known that phthalazine can be manufactured by hydrolysing tetrabromo - ortho - xylene in an aqueous or alcoholic solution, followed by reaction with hydrazine. Bromination is substantially more difficult to perform on an industrial scale than chlorination so that a process starting from tetrachloro-ortho-xylene would be preferable. Such processes are known, but in the previously used solvents (water and alcohol) they give yields below 70% since the hydrolysis progresses very slowly and resinous by-products are formed.

Conventionally, phthalazone used to be prepared by reacting phthaldehydic acid with hydrazine in an alkaline solution, phthaldehydic acid itself being obtained from phthalimide via the phthalide and 3-bromophthalide, or by oxidation of naphthalene.

According to the process of this invention $\alpha,\alpha,\alpha',\alpha'$-tetrachloro - ortho - xylenes or $\alpha,\alpha,\alpha,\alpha',\alpha'$ - pentachloroorthoxylenes or mixtures of these compounds are reacted with hydrazine sulphate in concentrated sulphuric acid and, if desired, the resulting phthalazines and/or phthalazones are isolated.

The present process gives a good yield (80 to 96%) of phthalazines from tetrachloro-ortho-xylenes, or of phthalazones directly from the readily accessible pentachloro-ortho-xylenes.

It is another advantage of the present process that a mixture of pentachloro- and tetrachloro-ortho-xylene resulting from the chlorination of ortho-xylene can be subjected to the reaction without prior separation.

The tetrachloro- and pentachloro-ortho-xylenes to be used as starting materials and, correspondingly, the final products, may be substituted in the carbocyclic aromatic nucleus, for example by halogen atoms such as fluorine, chlorine or bromine atoms. However, they are preferably unsubstituted.

Advantageously, the reaction is carried out by introducing the chlorinated xylenes into a mixture of hydrazine sulphate and concentrated sulphuric acid. Advantageously, a slight excess of hydrazine sulphate, for example 1.1 mols per mol of chlorinated xylenes, is used.

When working on a larger scale it is of advantage to heat the mixture of hydrazine sulphate and sulphuric acid from the outset to the reaction temperature, for example 130–150° C., particularly 140° C., and then to add the chlorinated xylene in molten form. The course of the reaction is then smoother; more especially the evolution of hydrochloric acid gas can be kept under control all the time.

The sulphuric acid is used in concentrated form, primarily of a strength of more than 75% by weight. For the manufacture of phthalazine, sulphuric acid of 90 to 98% strength by weight is preferably used whereas in the manufacture of phthalazones or of a mixture of phthalazines and phthalazones 90 to 94% sulphuric acid is employed.

The phthalazines and phthalazones respectively may be isolated, for example, by pouring the reaction mixture into water, whereupon phthalazone precipitates, whereas phthalazine can then be isolated and purified by the usual methods, for example by extraction and distillation and/or recrystallisation.

The products of the present process are valuable intermediates for the manufacture of medicaments. Thus, for example, the phthalazines obtained may be used for making the 2-aralkylphthalazinium salts having an antiparasitic and anthelmintic activity described in Belgian Patent No. 646,344, for example the 2-(2',3',4',5',6'-pentachlorobenzyl)-phthalazinium halides by reacting, for example, an aralkyl halide with the phthalazine. When, for example, the phthalazones of this invention are converted into the corresponding 1-chloro-phthalazines and the latter are reacted with hydrazine, the 1-hydrazinophthalazines are obtained which lower the blood pressure and have been disclosed, for example in U.S. specification No. 2,484,029.

The starting materials are known.

The following examples illustrate the invention.

EXAMPLE 1

30 ml. of water and 143 g. (1.1 mols) of hydrazine sulphate are added to 300 ml. (about 5 mols) of concentrated sulphuric acid. While stirring the mixture it is heated to 60° C. (during which sulphuric acid is saturated with hydrazine sulphate). 279 g. (1 mol) of $\alpha,\alpha,\alpha,\alpha',\alpha'$-pentachloro-ortho-xylene are then added, and the temperature is slowly raised further while stirring. A brisk evolution of hydrochloric acid gas soon sets in. By maintaining a suitable reaction temperature (70° to 100° C.) this evolution of gas can be controlled. When the elimination of gas subsides, the temperature is further raised, finally to 130° C. and this temperature is maintained for one hour. The batch is then cooled to room temperature and 100 ml. of water are added dropwise, whereby the excess of hydrazine sulphate is caused to precipitate. After 15 minutes the reaction mixture is filtered through glass fibres and the filtrate stirred into 1½ litres of water, whereupon the phthalazone of the formula

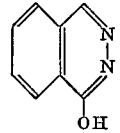

precipitates in voluminous form. It is stirred overnight at room temperature, filtered and thoroughly rinsed with water.

After drying the product under vaccum at 90° C., there are obtained 125 g. (=85.5% of theory) of pure phthalazone melting at 184°–185° C.

EXAMPLE 2

143 g. (1.1 mols) of hydrazine sulphate are added to 200 ml. (3 mols) of concentrated sulphuric acid, and while stirring the mixture it is heated to 60° C. At this temperature 244 g. (1 mol) of α,α,α',α'-tetrachloro-ortho-xylene are added, and the temperature is further raised with stirring. A brisk evolution of hydrochloric acid gas soon sets in. This evolution of gas is controlled by maintaining a suitable reaction temperature (70° to 90° C.). When the evolution of gas diminishes, the batch is further heated, finally to 130° C., and this temperature is maintained for one hour. The reaction mixture is then cooled to room temperature and 80 ml. of water are added dropwise (to precipitate the excess of hydrazine sulphate).

After 15 minutes the reaction mixture is filtered through glass fibres and the filtrate is poured into 2 litres of water.

The mixture is rendered strongly alkaline (pH above 11) with about 1 litre of sodium hydroxide solution of 30% strength, and the turbid solution is treated with active carbon and filtered.

The phthalazine of the formula

is obtained by repeated extraction with methylene chloride followed by washing and evaporation of the extract. It melts at 87° to 90° C. Yield: 115 g. (=88.5% of theory).

The product can be purified by distillation in a high vacuum or by recrystallisation from toluene.

EXAMPLE 3

20 ml. of water and 143 g. (1.1 mols) of hydrazine sulphate are added to 200 ml. of concentrated sulphuric acid. While stirring the mixture, it is heated to 60° C. 265 g. of a chlorinating mixture [consisting of 128 g. (0.52 mol) of α,α,α',α'-tetrachloroxylene, 127 g. (0.46 mol) of α,α,α,α',α'-pentachloroxylene and 10 g. of various chlorinating products] are added. While stirring the whole, the temperature is further raised (to 70°–100° C.). When the evolution of gas subsides, the temperature is further raised, finally to 130° C. and this temperature is maintained for one hour. The batch is then cooled to room temperature and 80 mi. of water are dropped in. After 15 minutes' stirring at room temperature the batch is filtered through glass fibres to remove the excess hydrazine sulphate, and the filtrate is poured into 2 litres of water. After a few hours the precipitated phthalazone is filtered off, washed and dried. The filtrate is rendered, strongly alkaline with NaOH and the phthalazine is isolated as described in Example 2.

Yield: 58.6 g. of phthalazone (=88% of theory) +65 g. of phthalazine (=96% of theory).

EXAMPLE 4

30 ml. of water and 143 grams (1.1 mols) of hydrazine sulphate are added to 300 ml. (about 5 mols) of concentrated sulphuric acid of 96% strength. The batch is heated to 140° C. with stirring, and 279 grams (1 mol) of molten α:α:α:α':α'-pentachloro-ortho-xylene are added in the course of 1 to 2 hours. The evolution of hydrochloric acid gas can be regulated by the speed at which the α:α:α:α':α'-pentachloroxylene is added. When the addition is complete, the temperature is maintained for another 30 minutes at 140° C. The batch is then cooled to room temperature and 100 ml. of water are added. The batch is worked up as described in Example 1.

This procedure can be used analogously for the manufacture of phthalazine from α:α:α':α'-tetrachloro-ortho-xylene.

What is claimed is:

1. A process for the manufacture of phthalazines, wherein a member selected from the group consisting of α,α,α',α'- tetrachloro - ortho - xylene and α,α,α',α'- tetrachloro-ortho-xylene halogen-substituted in the carbocyclic aromatic nucleus is reacted with hydrazine sulfate in concentrated sulphuric acid.

2. A process as claimed in claim 1, wherein as concentrated sulfuric acid sulfuric acid of 90–98% strength by weight is used.

3. A process as claimed in claim 2, wherein a slight excess of hydrazine sulphate is used.

4. A process as claimed in claim 2, wherein the mixture of hydrazine sulphate and sulphuric acid is heated to the reaction temperature and the α,α,α',α'-tetrachloro-ortho-xylene compound is then added.

5. A process for the manufacture of phthalazones, wherein a member selected from the group consisting of α,α,α',α'-pentachloro-ortho-xylene and α,α,α,α',α'-pentachloro-ortho-xylene halogen-substituted in the carbocyclic aromatic nucleus is reacted with hydrazine sulfate in concentrated sulphuric acid.

6. A process as claimed in claim 5, wherein as concentrated sulphuric acid sulphuric acid of more than 75% strength by weight is used.

7. A process as claimed in claim 5, wherein as concentrated sulfuric acid sulfuric acid of 90–94% strength by weight is used.

8. A process as claimed in claim 7, wherein a slight excess of hydrazine sulphate is used.

9. A process as claimed in claim 7, wherein 1.1 mols of hydrazine sulphate are used for 1 mol of chlorinated xylene.

10. A process as claimed in claim 7, wherein the mixture of hydrazine sulphate and sulphuric acid is heated to the reaction temperature and the α,α,α,α',α'-pentachloro-ortho-xylene compound is then added.

11. A process for the manufacture of a mixture of phthalazines and phthalazones, wherein a mixture of a member selected from the group consisting of α,α,α',α'-tetrachloro-ortho-xylene and α,α,α',α'-tetrachloro-ortho-xylene substituted in the carbocyclic aromatic nucleus by halogen and of a member selected from the group consisting of α,α,α,α',α'-pentachloro-ortho-xylene and α,α,-α,α',α'-pentachloro-ortho-xylene substituted in the carbocyclic aromatic nucleus by halogen is reacted with hydrazine sulfate in concentrated sulphuric acid.

12. A process as claimed in claim 11, wherein as concentrated sulfuric acid sulfuric acid of 90–94% strength by weight is used.

13. A process as claimed in claim 12, wherein a slight excess of hydrazine sulphate is used.

14. A process as claimed in claim 12, wherein the mixture of hydrazine sulphate and sulphuric acid is heated to the reaction temperature and the chlorinated xylene compounds are then added.

15. A process as claimed in claim 11, wherein the phthalazone is separated by pouring the reaction mixture into water.

No references cited.

NICHOLAS S. RIZZO, *Primary Examiner.*